(12) United States Patent
Yang et al.

(10) Patent No.: US 11,048,417 B2
(45) Date of Patent: Jun. 29, 2021

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Yue Yang, Beijing (CN); Xin Zhong, Beijing (CN); Yangfeng Chen, Beijing (CN); Qinghua Ling, Beijing (CN); Yan Shao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 16/569,048

(22) Filed: Sep. 12, 2019

(65) Prior Publication Data

US 2020/0133534 A1 Apr. 30, 2020

(30) Foreign Application Priority Data

Oct. 31, 2018 (CN) .......................... 201811286665.8

(51) Int. Cl.
*G06F 12/00* (2006.01)
*G06F 3/06* (2006.01)

(52) U.S. Cl.
CPC .......... *G06F 3/0631* (2013.01); *G06F 3/0617* (2013.01); *G06F 3/0652* (2013.01); *G06F 3/0653* (2013.01); *G06F 3/0673* (2013.01)

(58) Field of Classification Search
CPC .... G06F 3/0631; G06F 3/0617; G06F 3/0652; G06F 3/0653; G06F 3/0673
See application file for complete search history.

(56) References Cited

U.S. PATENT DOCUMENTS

| | | | | |
|---|---|---|---|---|
| 5,873,118 A * | 2/1999 | Letwin | .................. | G06F 3/0608 711/156 |
| 6,961,812 B2 * | 11/2005 | Bjork | ................. | G11B 20/1251 369/47.1 |
| 7,185,029 B1 * | 2/2007 | Titus | ....................... | G06F 16/10 |
| 7,587,630 B1 * | 9/2009 | Cassell | ............... | G06F 11/1088 714/47.3 |
| 7,945,749 B2 * | 5/2011 | Shinozaki | ........... | G06F 11/2082 711/162 |
| 8,166,263 B2 * | 4/2012 | Prahlad | ............... | G06F 11/1464 711/162 |
| 9,037,538 B2 * | 5/2015 | Sampathkumar | ....... | G06F 3/067 707/610 |
| 9,842,117 B1 * | 12/2017 | Zhou | ..................... | G06F 16/178 |

(Continued)

*Primary Examiner* — John A Lane
(74) *Attorney, Agent, or Firm* — BainwoodHuang

(57) ABSTRACT

Techniques perform storage management. Such techniques involve: detecting a change of a size of storage space for a file system, the file system having one or more associated bitmaps, each active bit in the one or more bitmaps indicating data status in storage space not exceeding an upper size limit of the file system; in response to detecting the change, determining, based on the upper size limit, a first number of bits required for indicating the changed storage space; and in response to determining that the first number exceeds a second number of current active bits in the one or more bitmaps, allocating at least one additional active bit for the file system. Accordingly, the number of bits for indicating the file system can be dynamically adjusted based on the changes of the file system.

17 Claims, 4 Drawing Sheets

(56) References Cited

U.S. PATENT DOCUMENTS

| | | | | |
|---|---|---|---|---|
| 10,254,978 B2* | 4/2019 | Albertson | ............... | G06F 3/067 |
| 10,482,012 B1* | 11/2019 | Gordon | ............... | G06F 12/0284 |
| 2004/0068635 A1* | 4/2004 | Bjork | ................. | G11B 20/1251 |
| | | | | 711/171 |
| 2006/0112302 A1* | 5/2006 | Cherian | ............. | G06F 11/2094 |
| | | | | 714/6.22 |
| 2016/0011811 A1* | 1/2016 | Garson | ................ | G06F 3/0608 |
| | | | | 711/154 |
| 2019/0317918 A1* | 10/2019 | Wenzel | ................ | G06F 16/125 |

\* cited by examiner

METHOD, DEVICE AND COMPUTER PROGRAM PRODUCT FOR STORAGE MANAGEMENT

CROSS-REFERENCE TO RELATED APPLICATION

This application claims priority to Chinese Patent Application No. CN201811286665.8, on file at the China National Intellectual Property Administration (CNIPA), having a filing date of Oct. 31, 2018, and having "METHOD, DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to the field of storage technologies, and more specifically, to a method, a device and a computer program product for storage management.

BACKGROUND

Data protection has become more and more important with the development of data storage technologies. In order to prevent data damage resulted from collapse of a single storage device in a storage system, there is proposed a solution for improving fault tolerance rate of a storage system by setting up mirror storage devices. Since the capacity of a single storage device is usually huge, the approach for effectively realizing data synchronization between two storage devices has become a focus of interest.

SUMMARY

Embodiments of the present disclosure provide a solution for storage management.

In accordance with a first aspect of the present disclosure, there is provided a method for storage management. The method includes: detecting a change of a size of storage space for a file system, the file system having one or more associated bitmaps, each active bit in the one or more bitmaps indicating data status in storage space not exceeding an upper size limit of the file system; in response to detecting the change, determining, based on the upper size limit, a first number of bits required for indicating the changed storage space; and in response to determining that the first number exceeds a second number of current active bits in the one or more bitmaps, allocating at least one additional active bit for the file system.

In accordance with a second aspect of the present disclosure, there is provided a device for storage management. The device includes: at least one processing unit; at least one memory coupled to the at least one processing unit and storing instructions for execution by the at least one processing unit, the instructions, when executed by the at least one processing unit, causing the apparatus to perform acts including: detecting a change of a size of storage space for a file system, the file system having one or more associated bitmaps, each active bit in the one or more bitmaps indicating data status in storage space not exceeding an upper size limit of the file system; in response to detecting the change, determining, based on the upper size limit, a first number of bits required for indicating the changed storage space; and in response to determining that the first number exceeds a second number of current active bits in the one or more bitmaps, allocating at least one additional active bit for the file.

In accordance with a third aspect of the present disclosure, there is provided a computer program product being stored in a non-transitory computer storage medium and including machine-executable instructions. The machine-executable instructions which, when executed by a device, cause the device to perform any step of the method described according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION OF EMBODIMENTS

Figure 1:
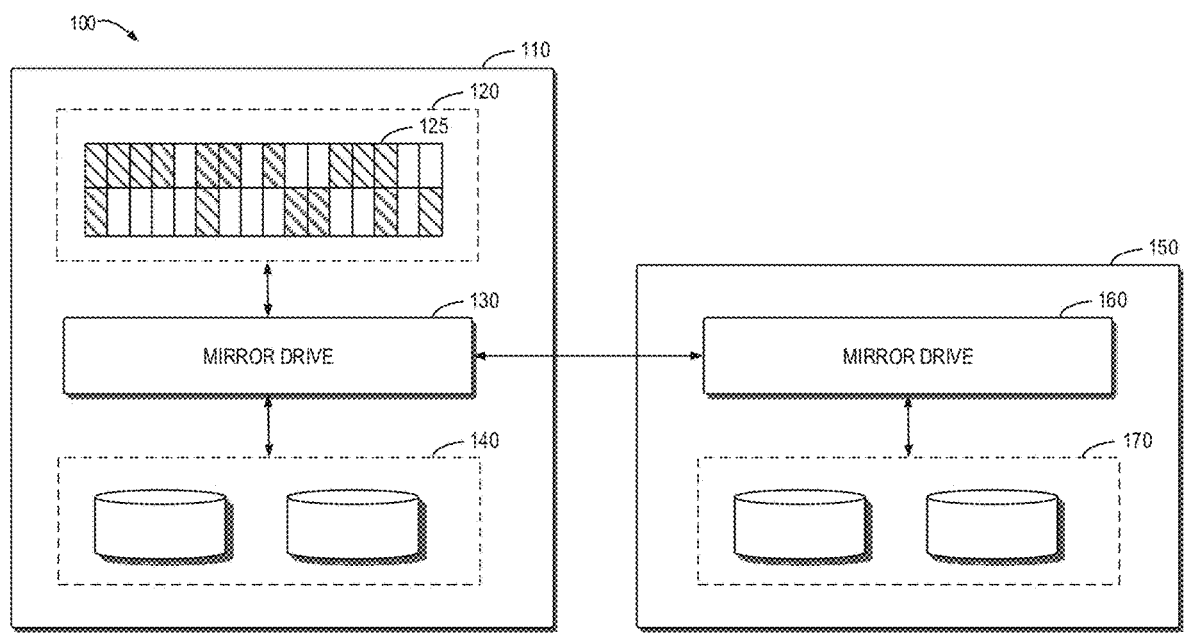
FIG. 1 illustrates an architecture diagram of a storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As described above, traditionally, collapse of storage devices can be prevented by setting up mirror storage devices. FIG. 1 illustrates a storage system 100 in which embodiments of the present disclosure can be implemented. According to FIG. 1, the storage system 100 includes a primary storage system 110 and a mirror storage system 150, wherein the primary storage system 110 can include a storage device 140 (hereinafter referred to as "first storage device" for the sake of description) for storing data and a mirror driver 130 (hereinafter referred to as "first mirror driver" for the sake of description) for communicating with the mirror storage system 150. In some embodiments, the storage device 140 can be Hard Disk Drive (HDD), Solid-State Disk (SSD) or flash memory etc.

The mirror storage system 150 can include a mirror driver 160 (hereinafter referred to as "second mirror driver" for the sake of description) for communicating with the primary storage system 150. The mirror storage system also can include a storage device 170 (hereinafter referred to as "second storage device" for the sake of description) for storing mirror data. In some embodiments, the storage device 170 can be Hard Disk Drive (HDD), Solid-State Disk (SSD) or flash memory etc.

As shown in FIG. 1, the primary storage system 110 also includes a bitmap 120, which can be used for indicating data status in the storage device 140. Specifically, the bitmap 120 can contain one or more bits 125, each bit 125 indicating data status of a storage space corresponding to the bit 125 in the storage device 140. For example, when the primary storage system 110 receives a write request during use, the primary storage system 110 can write target data associated with the write request into a corresponding storage space of the first storage device 140, and mark one or more bits 125 corresponding to the storage space as "dirty" (such as block indicated by right slash in the drawings) in the bitmap 120. Subsequently, the primary storage system 110 can communicate, via a first mirror driver 130, with a second mirror driver 160 to instruct the mirror storage system 150 to write the target data in corresponding positions. In response to receiving the instruction, the mirror storage system 150 can write the target data into a corresponding storage space of the second storage device 170, and send to the primary storage system 110, via the second mirror driver 160, an indication that data write has been completed. In response to receiving the completion indication, the primary storage system 110 can mark a corresponding bit 125 in the bitmap 120 as "clean," so as to indicate that the data in the target storage space of the storage device 140 have been written into the mirror storage system 150.

When the mirror storage system 150 collapses for example due to outage, the corresponding data is not able to be written into the second storage device 170. In this case, the bitmap 120 records which data in the first storage device 140 should be synchronized to the mirror storage system 150. Accordingly, when the mirror storage system 150 goes back online, the first mirror driver 130 can detect the reconnection to the second mirror driver 160. The primary storage system 110 can then be instructed to synchronize data in the storage space of the bit 125 being marked as "dirty" of the bitmap 120 in the first storage device to the mirror storage system 150. Therefore, the synchronization overheads are reduced.

The primary storage system 110 usually indicates data status in the storage device 140 by the bitmap 120 with a fixed number of bits 125. However, the storage space corresponding to the storage device 140 varies along with the changes of the file system size. When the size of the storage device 140 is continuously increasing, the size of the storage space corresponding to a single bit 125 of the bitmap 120 is also growing. For example, if the size of the storage device 140 increases to 256 TB and the bitmap 120 is still 16 KB only, the storage space corresponding to the single bit 125 is changed to 256 TB/(16 KB*8)=2 GB. In other words, even if a single modification only modifies 1 MB of storage space in the first storage device 140, the primary storage system 110 also needs to synchronize at least 2 GB data to the mirror storage system 150, which greatly affects the efficiency of the storage system 100.

In accordance with embodiments of the present disclosure, there is provided a solution for storage management. In this solution, when the size of the storage space of the file system changes, the number of bits required for indicating the changed storage space is determined in accordance with a predetermined upper size limit of a storage device which can be indicated by a single bit. If it is determined that the number of bits in the current bitmap is less than the required number of bits, at least one additional active bit is allocated to the file system. In this way, an upper limit of the storage space which can be indicated by a single bit is preset. The dynamic allocation of additional active bits ensures that the single bit only indicates data status of storage space within an acceptable range, which improves the efficiency of the storage system 100.

Figure 2:
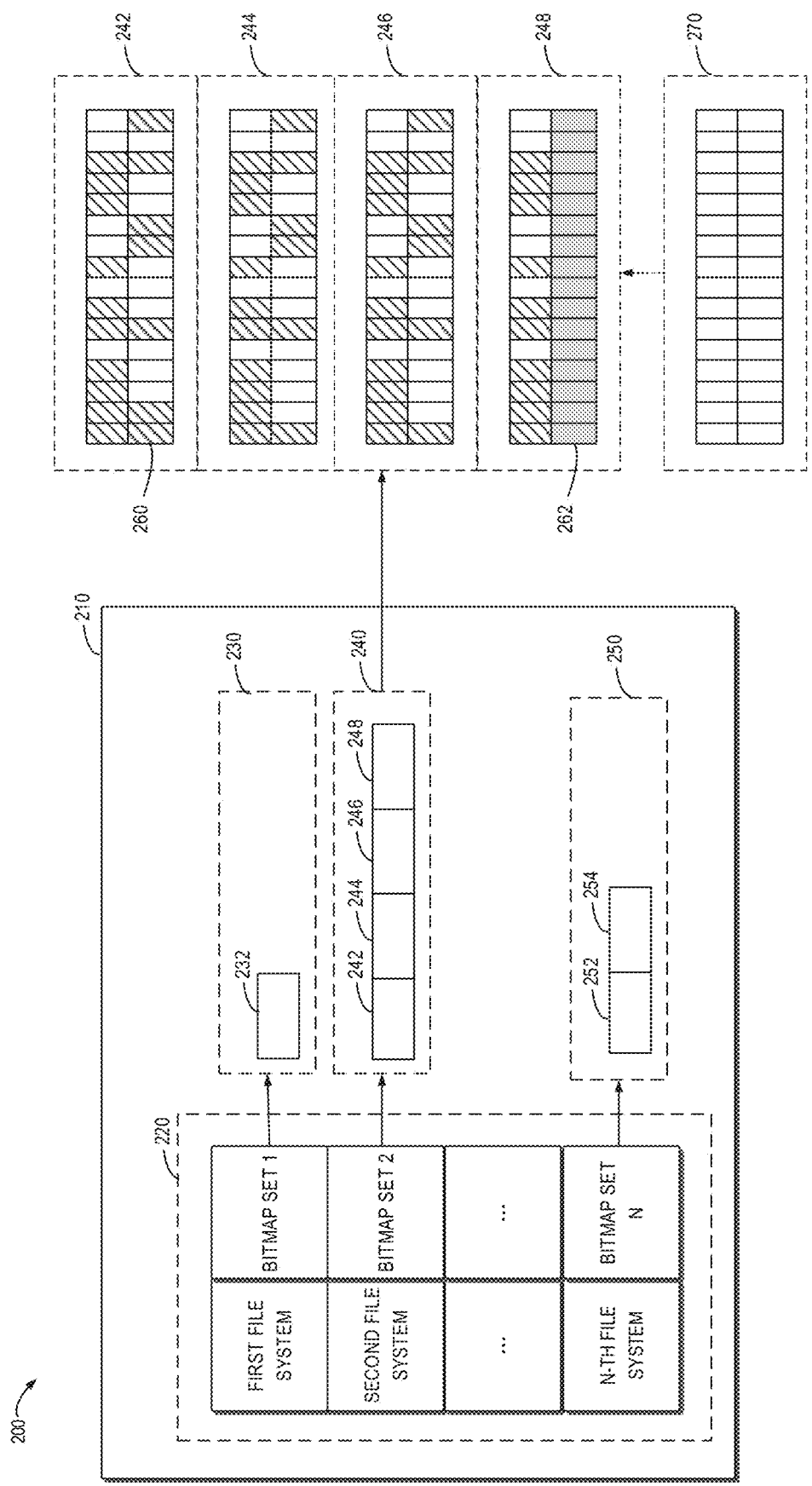
FIG. 2 illustrates a schematic diagram of bitmap management in accordance with embodiments of the present disclosure.

FIG. 2 illustrates a schematic diagram 200 of bitmap management in accordance with embodiments of the present disclosure. As shown in FIG. 2, a bitmap manager 210 includes a bitmap mapping table 220, which stores mapping relations between different file systems and corresponding bitmap sets. In some embodiments, the bitmap mapping table 220 is stored therein with an ID of a file system and a pointer directing to a corresponding bitmap. Based on the bitmap mapping table, a bitmap set corresponding to the file system can be determined. As shown in FIG. 2, a first file system is associated with the bitmap set 1 230, which includes one bitmap 232. A second file system is associated with the bitmap set 2 240, which includes 4 bitmaps 242, 244, 246 and 248. An N-th file system is associated with the bitmap set N 250, which includes 2 bitmaps 252 and 254.

In some embodiments, each file system can have one or more default bitmaps and these bitmaps will not be reclaimed as the file system changes. For example, a default bitmap of 16 KB can be configured for each file system.

By taking the bitmap set 240 as an example, each bitmap in the bitmaps 242, 244, 246 and 248 can include one or more bits 260, which may be used for indicating status of the storage space. In order to facilitate the description, such bit is referred to as "active bit" in the present disclosure. According to FIG. 2, the bitmap 248 also includes one or more unused bits 262, which are referred to as "invalid bit" in the present disclosure for the sake of description.

Figure 3:
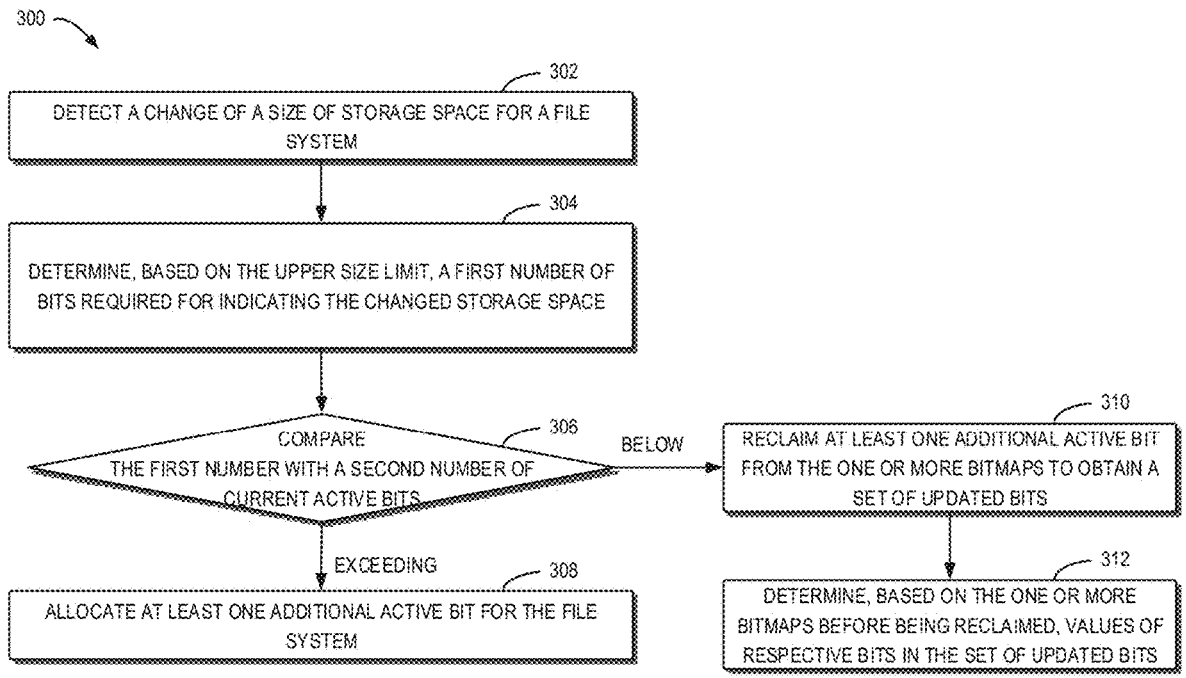
FIG. 3 illustrates a flowchart of a method for storage management in accordance with embodiments of the present disclosure.
Figure 4:
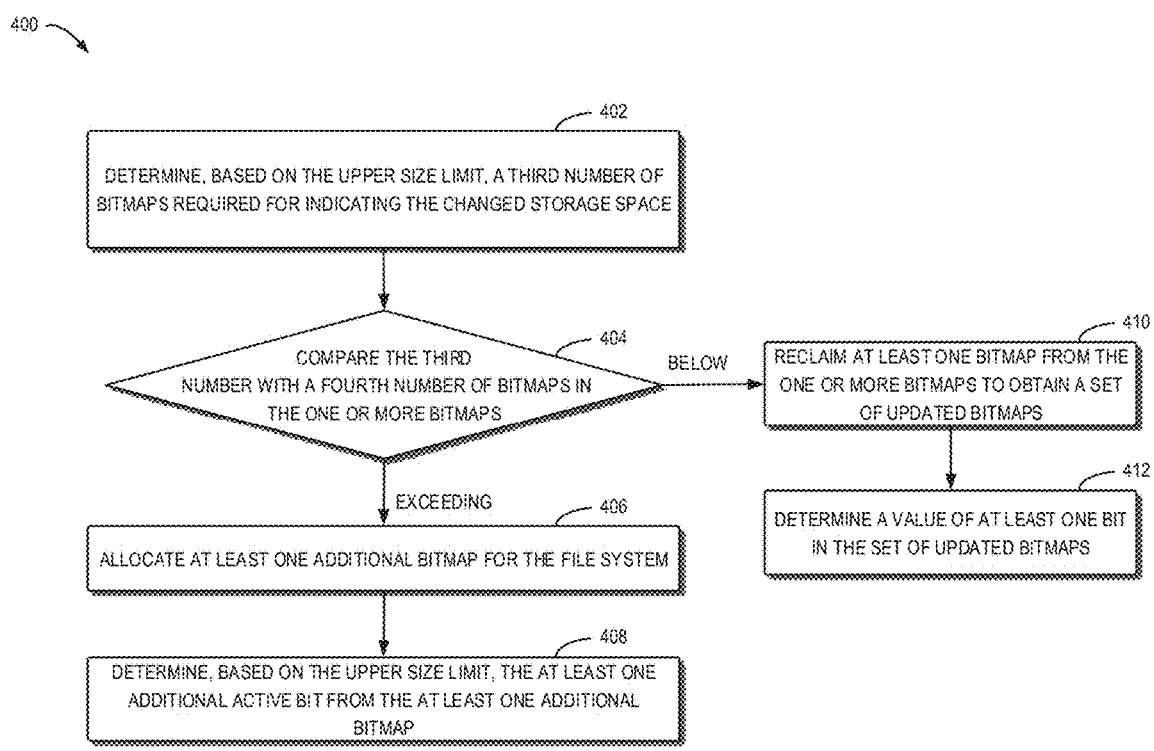
FIG. 4 illustrates a flowchart of a method for allocating at least one additional active bit in accordance with embodiments of the present disclosure.

A method for storage management in accordance with embodiments of the present disclosure will be described below with reference to FIGS. 3 to 4. FIG. 3 illustrates a flowchart of a method 300 for storage management in accordance with embodiments of the present disclosure. The method 300 can be implemented at the bitmap manager 210 and the actions involved in the method 300 will be described below with reference to FIG. 2.

At block 302, the bitmap manager 210 detects a change of a size of the storage space of the file system, wherein the file system contains one or more associated bitmaps and each active bit in the one or more bitmaps indicates data status not exceeding an upper size limit in the storage space. By taking the second file system in FIG. 2 as an example, the second file system, according to FIG. 2, includes a corresponding bitmap set 240 including 4 bitmaps 242, 244, 246 and 248. In some embodiments, the bitmap manager 210 can preset an upper size limit of a storage space which can be indicated by a single bit 260 in the bitmap. For example, the bitmap manager 210 can set the upper size limit to 32 MB. It should be appreciated that the above numeric value is by way of example only and those skilled in the art can set any other suitable values. By setting a fixed upper size limit, the bitmap manager 210 can ensure that the single bit 260 only indicates an acceptable storage space size, so as to avoid synchronizing a large amount of data when only a small amount of data are modified in the storage space, thereby enhancing the efficiency of the storage system.

At block 304, in response to detecting the change, the bitmap manager 210 determines, based on the above upper size limit, the number of bits (hereinafter referred to as "first number" for sake of description) required for indicating the changed storage space. Continue to refer to the example of FIG. 2. Assuming the changed file system is 14 TB, the number of bits required for indicating the changed file system is 14 TB/(3 MB×8)=56 K, where 1 K represents 1024.

At block 306, the bit manager 210 compares the first number with the number of current active bits (hereinafter referred to as "second number" for sake of description) in the one or more bitmaps. In response to determining, at block 306, that the first number exceeds the second number, the method 300 proceeds to block 308, i.e., the bitmap manager 210 allocates at least one additional active bit for the file system. In one example, when the storage system 2 contains 1 default system bitmap 242 of 16 KB only, the second number of active bits is 16 K, i.e., below the required first number of bits. Accordingly, the bitmap manager 210 can further apply for 40 K additional active bits on the basis of the existing default system bitmap 242, so as to ensure that the storage space size indicated by the single active bit will not exceed the upper size limit 32 MB.

In a further example, assuming the second file system continues to change to 16 TB on the basis of 14 TB, the number of bits required for indicating the changed file system is 16 TB/(32 MB×8)=64 K. Therefore, the bit manager 210 can further apply for 8 K additional active bits on the basis of the original 54 K bits.

In response to determining, at block 306, that the first number is below the second number, the method proceeds to block 310, i.e., the bitmap manager 210 reclaims from the one or more bitmaps at least one additional active bit to obtain a set of updated bits, which contain at least a set of default bits in the system bitmap. In one example, if the second file system, for example, continues to change from 16 TB to 14 TB, the number of bits required for indicating the changed file system is 14 TB/(32 MB×8)=56 K, while the number of bits before change is 64 K. At this point, the bitmap manager 210 can reclaim 8 K additional active bits from the existing 64 K bits.

In some examples, if the second file system, for example, continues to change from 14 TB to 3 TB, the number of bits required for indicating the changed file system is 3 TB/(32 MB×8)=12 K. As 12 K is below the number of bits (16 K) in the system default bitmap, the bitmap manager 210 will not directly reclaim the 44 K active bits. Instead, the bit manager 210 only reclaims the follow-up allocated 40 additional active bits, without reclaiming a default set of bits in the system bitmap. At this time, the bitmap manager 210 can continue to adjust the size of the storage space corresponding to the single bit in the system bitmap. For example, the size of the storage space corresponding to the single bit can be adjusted to 3 TB/(16 KB×8)=24 MB.

At block 312, the bitmap manager 210 determines, based on the one or more bitmaps before being reclaimed, values of the respective bits in the set of updated bits. Specifically, the bitmap manager 210 can determine data status in the storage space based on the one or more bitmaps before being reclaimed, and determine the values of the respective bits in the set of updated bits in accordance with the storage space range corresponding to each bit in the set of updated bits, so as to complete the switching between old bitmap set and new bitmap set.

In this way, the bitmap manager 210 can dynamically apply for and reclaim the additional active bits according to the changes of the file system size. While ensuring that the size of the storage space indicated by each bit will not be too huge, the bitmap manager also can more effectively manage the storage space required by the bitmap. In addition, the efficiency of data synchronization between the primary storage system and the mirror storage system will be greatly enhanced through the above approach.

The method of applying for additional active bits in units of bit is described above. In some embodiments, the additional active bits also can be applied for in units of bitmap. A flowchart of a method 400 for allocating at least one additional active bit in units of bitmap in accordance with embodiments of the present disclosure will be described below with reference to FIG. 4.

At block 402, the bitmap manager 210 determines, based on the upper size limit, the number of bitmaps (hereinafter referred to as "third number" for the sake of description) required for indicating the changed storage space. By taking FIG. 2 as the example, on the assumption that the size of the file system changes from 3 TB to 14 TB while the upper size limit remains as 32 MB and the size of a single bitmap is 16 KB, the number of bitmaps required for indicating the changed file system is [14 TB/(32 MB×16 K*8)]=[3.51]=4. In other words, 4 bitmaps of 16 KB are required, wherein [A] represents a minimum integer no less than A.

At block 404, the bit manager 210 compares the third number with the number of bitmaps (hereinafter referred to as "fourth number" for the sake of description) in the one or more bitmaps. In response to determining, at block 404, that the third number exceeds the fourth number, at least one additional bitmap is allocated for the file system. In one example, when the storage system 2 has only one default 16 KB system bitmap 242, and the fourth number is then 1, which is below the required third number of bitmaps. Accordingly, the bitmap manager 210 can further apply for 3 additional bitmaps on the basis of the existing default system bitmap 242, so as to ensure that the size of the storage space indicated by a single active bit will not exceed the upper size limit 32 MB. At this moment, additional bitmaps 244, 246 and 248 can be allocated for the second file system.

At block 406, the bitmap manager 210 determines, from the at least one additional bitmap, the at least one additional active bit based on the upper size limit. Continue to refer to the example of FIG. 2. For the storage space of 14 TB, the bitmap manager 210 can determine, based on 14 TB/(32 MB×16 K*8)=3.5, that 3 full bitmaps of 16 KB and half of the bits in the fourth bitmap of 16 KB are utilized. That is, there are one or more unused invalid bits 262 in the additional bitmap 248.

In another example, assuming the size of the second file system changes from 14 TB to 20 TB, the required number of bitmaps is [20 TB/(32 MB×16 K*8)]=[5]=5 at this point. Therefore, the bitmap manager 210 can continue to allocate a new additional bitmap 270 to the second file system and also can determine, based on 20 TB/(32 MB×16 K*8)=5, setting the bits in all five bitmaps 242, 244, 246, 248 and 270 act as active bits.

In response to determining, at block 404, that the third number is below the fourth number, the method 400 proceeds to block 410, i.e., the bitmap manager 210 reclaims from the one or more bitmaps at least one bitmap to obtain a set of updated bitmaps, wherein the set of updated bitmaps include at least the system bitmap. In one example, if the second file system, for example, changes from 20 TB to 14 TB, the number of bitmaps required for the changed file system is 4. At this moment, the bitmap manager 210 can reclaim an additional bitmap 270 from the existing 5 bitmaps 242, 244, 246, 248 and 270.

In a further example, if the second file system, for example, continues to change from 14 TB to 3 TB, the number of bits required for indicating the changed file system is [20 TB/(32 MB×16 K*8)]=1. At this point, the bitmap manager 210 reclaims the previously allocated additional bitmaps 244, 246 and 270, without reclaiming the system bitmap 242. In this case, the bitmap manager 210 can continue to adjust the size of the storage space corresponding to the single bit in the system bitmap. For example, the size of the storage space corresponding to the single bit can be adjusted to 3 TB/(16 KB×8)=24 MB.

At block 412, the bitmap manager 210 determines, based on the one or more bitmaps before being reclaimed, a value of at least one bit in the set of updated bitmaps. Specifically, the bitmap manager 210 can determine data status in the storage space based on the one or more bitmaps before being reclaimed, and determine the value of each bit in the set of updated bits in accordance with the storage space range corresponding to the respective bits in the set of updated bitmaps, so as to complete the switching between the old bitmap set and the new bitmap set.

Specifically, the bitmap manager 210 can determine, based on the above upper size limit, whether there is an additional active bit in the set of the updated bitmaps. If it is determined that the additional active bit exists in the set of the updated bitmaps, it means that the bits in the one or more bitmaps still correspond to the storage space of the upper size limit. Therefore, the bitmap manager 210 can determine, based on the one or more bitmaps before being reclaimed, a default set of bits in the default system bitmap and the value of the additional active bit. If there is not additional active bit in the set of bitmaps, it means that the size of the storage space corresponding to the single bit may change. Therefore, the values of the respective bits in the set of updated bitmaps can be calculated in accordance with the newly calculated size of the storage space corresponding to the single bit.

The bitmap manager can more easily locate a position of the bit corresponding to the target storage range in the bitmap by the allocation approach in units of bitmap, which further improves the system efficiency. For example, the bitmap manager can determine a bitmap where the storage range is located in accordance with position range of the target storage space and a modulus of the size of the storage space corresponding to the single bitmap, and then determine a bit corresponding to it in the bitmap based on the offset. Moreover, the bitmap manager also can more conveniently manage allocation and reclaiming of the bitmap based on the allocation approach in units of bitmap.

Figure 5:
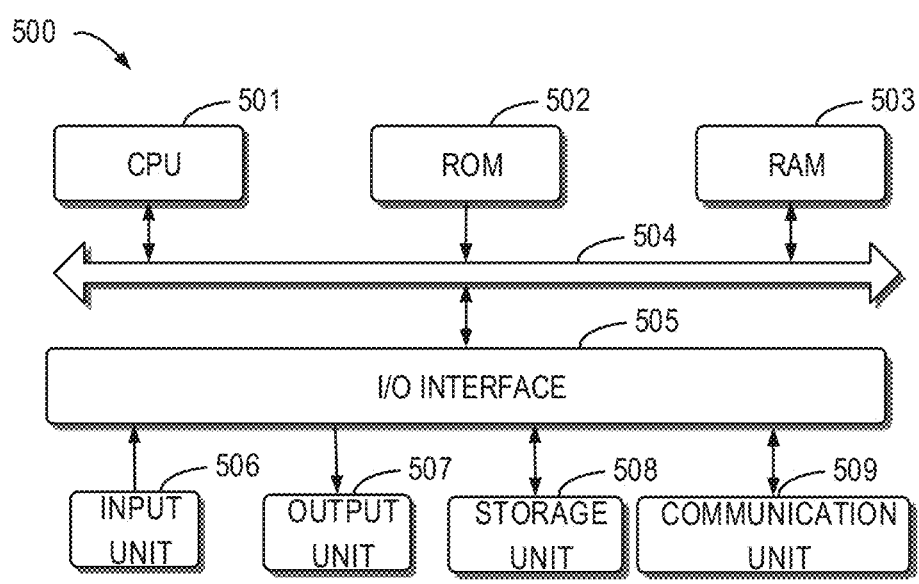
FIG. 5 illustrates a schematic block diagram of an example device for implementing embodiments of the present disclosure.

FIG. 5 illustrates a schematic block diagram of an example device 500 for implementing embodiments of the present disclosure. For example, a bitmap manager of FIG. 2 can be implemented by the device 500. As shown in FIG. 5, the apparatus 500 includes a central processing unit (CPU) 501 which is capable of performing various processes in accordance with computer program instructions stored in a read only memory (ROM) 502 or computer program instructions loaded from a storage unit 508 to a random access memory (RAM) 503. In the RAM 503 are stored various programs and data as required by operation of the apparatus 500. The CPU 501, the ROM 502 and the RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507 such as various types of displays and speakers; the storage unit 508 such as a magnetic disk or optical disk; and a communication unit 509 such as a network card, a modem, a wireless communication transceiver or the like. The communication unit 509 allows the device 500 to exchange information/data with other devices through a computer network such as the Internet and/or various types of telecommunication networks.

The processing unit 501 performs various method and processes described above, for example method 300 and/or method 400. For example, in some embodiments, the method 300 and/or method 400 may be implemented as a computer software program or computer program product, which is tangibly contained in a machine-readable medium, for example the storage unit 508. In some embodiments, part or all of the computer program may be loaded and/or installed on the device 500 via ROM 502 and/or communication unit 509. When the computer program is loaded in the RAM 503 and executed by CPU 501, one or more acts of the method 300 and/or method 400 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means (e.g., specialized circuitry) for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for storage management performed by a primary storage computing device, the method comprising:

detecting a change of a size of storage space for a file system stored on the primary storage computing device, the file system having one or more associated bitmaps, the one or more bitmaps indicating data mirroring status of the storage space of the filesystem, the one or more bitmaps having an active number of bits, each bit of the active number of bits of the one or more bitmaps representing whether a respective region of the file system contains any data that has not yet been mirrored to a mirror of the file system on a secondary storage computing device, the active number of bits being configured to represent up to an upper size limit of the file system;

in response to detecting the change, determining, based on the upper size limit, a required number of bits required for representing the changed storage space;

in response to determining that the required number exceeds the active number of current active bits in the one or more bitmaps, allocating at least one additional active bit for the file system; and synchronizing the file system from the primary storage computing device to the secondary storage computing device based on the one or more bitmaps.

2. The method of claim 1, further comprising:

in response to detecting a further change of size of storage space for the file system, determining, based on the upper size limit, a new required number of bits required for representing the changed storage space;

in response to the new required number being below the active number, reclaiming at least one additional active bit from the one or more bitmaps to obtain a set of updated bits, the set of updated bits including at least a set of default bits in a system bitmap; and determining, based on the one or more bitmaps before being reclaimed, values of respective bits in the set of updated bits.

3. The method of claim 1, wherein allocating the at least one additional active bit comprises:

determining, based on the upper size limit, a first number of bitmaps required for indicating the changed storage space;

comparing the first number with a second number of bitmaps in the one or more bitmaps;

in response to determining that the first number exceeds the second number, allocating at least one additional bitmap for the file system; and determining, based on the upper size limit, the at least one additional active bit from the at least one additional bitmap.

4. The method of claim 3, further comprising:

in response to detecting a further change of size of storage space for the file system, determining, based on the upper size limit, a third number of bitmaps required for indicating the changed storage space;

in response to determining that the third number is below the second number, reclaiming at least one bitmap from the one or more bitmaps to obtain a set of updated bitmaps, the set of updated bitmaps including at least a default system bitmap; and determining, based on the one or more bitmaps before being reclaimed, a value of at least one bit in the set of updated bitmaps.

5. The method of claim 4, wherein determining a value of the at least one bit in the set of updated bitmaps comprises:

determining, based on the upper size limit, whether there is an additional active bit in the set of updated bitmaps; and in response to determining that there is the additional active bit in the set of bitmaps, determining, based on the one or more bitmaps before being reclaimed, values of a set of default bits in the default system bitmap and a value of the additional active bit.

6. The method of claim 1 wherein determining the first required number of bits required for representing the changed storage space includes dividing the changed size of storage space for the file system by a predetermined upper size limit which can be indicated by a single bit.

7. The method of claim 6 wherein the predetermined upper size limit which can be indicated by a single bit is within a range of 16 to 64 megabytes.

8. A device for storage management, comprising:

at least one processing unit;

at least one memory coupled to the at least one processing unit and storing instructions for execution by the at least one processing unit, the instructions, when executed by the at least one processing unit, causing the apparatus to perform acts comprising:

detecting a change of a size of storage space for a file system, the file system having one or more associated bitmaps, each active bit in the one or more bitmaps indicating data status in storage space not exceeding an upper size limit of the file system;

in response to detecting the change, determining, based on the upper size limit, a first number of bits required for indicating the changed storage space; and in response to determining that the first number exceeds a second number of current active bits in the one or more bitmaps, allocating at least one additional active bit for the file system, wherein allocating the at least one additional active bit comprises:

determining, based on the upper size limit, a third number of bitmaps required for indicating the changed storage space;

comparing the third number with a fourth number of bitmaps in the one or more bitmaps;

in response to determining that the third number exceeds the fourth number, allocating at least one additional bitmap for the file system; and determining, based on the upper size limit, the at least one additional active bit from the at least one additional bitmap.

9. The device of claim 8, wherein the acts further comprise:

in response to detecting a further change of size of storage space for the file system, determining, based on the upper size limit, a fifth number of bits required for representing the changed storage space;

in response to the fifth number being below the second number, reclaiming at least one additional active bit from the one or more bitmaps to obtain a set of updated bits, the set of updated bits including at least a set of default bits in a system bitmap; and determining, based on the one or more bitmaps before being reclaimed, values of respective bits in the set of updated bits.

10. The device of claim 8, wherein the acts further comprise:

in response to detecting a further change of size of storage space for the file system, determining, based on the upper size limit, a sixth number of bitmaps required for indicating the changed storage space;

in response to determining that the sixth number is below the fourth number, reclaiming at least one bitmap from the one or more bitmaps to obtain a set of updated bitmaps, the set of updated bitmaps including at least a default system bitmap; and determining, based on the one or more bitmaps before being reclaimed, a value of at least one bit in the set of updated bitmaps.

11. The device of claim 10, wherein determining a value of the at least one bit in the set of updated bitmaps comprises:

determining, based on the upper size limit, whether there is an additional active bit in the set of updated bitmaps; and in response to determining that there is the additional active bit in the set of bitmaps, determining, based on the one or more bitmaps before being reclaimed, values of a set of default bits in the default system bitmap and a value of the additional active bit.

12. The device of claim 8, wherein determining the first number of bits required for representing the changed storage space includes dividing the changed size of storage space for the file system by a predetermined upper size limit which can be indicated by a single bit.

13. A computer program product being stored in a non-transitory computer storage medium and comprising machine-executable instructions which, when executed by a device, cause the device to perform acts comprising:

detecting a change of a size of storage space for a file system, the file system having one or more associated bitmaps, each active bit in the one or more bitmaps indicating data status in storage space not exceeding an upper size limit of the file system;

in response to detecting the change, determining, based on the upper size limit, a first number of bits required for indicating the changed storage space; and in response to determining that the first number exceeds a second number of current active bits in the one or more bitmaps, allocating at least one additional active bit for the file system, wherein allocating the at least one additional active bit comprises:

determining, based on the upper size limit, a third number of bitmaps required for indicating the changed storage space;

comparing the third number with a fourth number of bitmaps in the one or more bitmaps;

in response to determining that the third number exceeds the fourth number, allocating at least one additional bitmap for the file system; and determining, based on the upper size limit, the at least one additional active bit from the at least one additional bitmap.

14. The computer program product of claim 13, wherein the acts further comprise:

in response to detecting a further change of size of storage space for the file system, determining, based on the upper size limit, a fifth number of bits required for representing the changed storage space;

in response to the fifth number being below the second number, reclaiming at least one additional active bit from the one or more bitmaps to obtain a set of updated bits, the set of updated bits including at least a set of default bits in a system bitmap; and determining, based on the one or more bitmaps before being reclaimed, values of respective bits in the set of updated bits.

15. The computer program product of claim 13, wherein the acts further comprise:

in response to detecting a further change of size of storage space for the file system, determining, based on the upper size limit, a sixth number of bitmaps required for indicating the changed storage space;

in response to determining that the sixth number is below the fourth number, reclaiming at least one bitmap from the one or more bitmaps to obtain a set of updated bitmaps, the set of updated bitmaps including at least a default system bitmap; and determining, based on the one or more bitmaps before being reclaimed, a value of at least one bit in the set of updated bitmaps.

16. The computer program product of claim 15, wherein determining a value of the at least one bit in the set of updated bitmaps comprises:

determining, based on the upper size limit, whether there is an additional active bit in the set of updated bitmaps; and in response to determining there being the additional active bit in the set of bitmaps, determining, based on the one or more bitmaps before being reclaimed, values of a set of default bits in the default system bitmap and a value of the additional active bit.

17. The computer program product of claim 13, wherein determining the first number of bits required for representing the changed storage space includes dividing the changed size of storage space for the file system by a predetermined upper size limit which can be indicated by a single bit.

* * * * *